US009299007B2

(12) United States Patent
Utsumi (10) Patent No.: US 9,299,007 B2
(45) Date of Patent: Mar. 29, 2016

(54) METHODS AND APPARATUS FOR ITEM IDENTIFICATION USING BRIGHTNESS COMPENSATION

(71) Applicant: Yoshitaka Utsumi, Kamakura (JP)

(72) Inventor: Yoshitaka Utsumi, Kamakura (JP)

(73) Assignee: NCR Corporation, Duluth, GA (US)

( * ) Notice: Subject to any disclaimer, the term of this patent is extended or adjusted under 35 U.S.C. 154(b) by 128 days.

(21) Appl. No.: 14/165,657

(22) Filed: Jan. 28, 2014

(65) Prior Publication Data

US 2015/0213326 A1 Jul. 30, 2015

(51) Int. Cl.
*H04N 5/14* (2006.01)
*H04N 9/64* (2006.01)
*G06K 9/00* (2006.01)
*G06K 9/48* (2006.01)
*G06K 9/62* (2006.01)
*H04N 5/232* (2006.01)

(52) U.S. Cl.
CPC .......... *G06K 9/6212* (2013.01); *H04N 5/23229* (2013.01)

(58) Field of Classification Search
CPC ........... G06T 2207/10024; G06K 9/48; G06K 9/00456; G06K 9/3241; G06K 9/34; G06K 9/4609; G06K 2209/27; G06K 9/00617; G06K 9/00771; G06K 9/00805; G06K 9/00892; H04N 9/646; H04N 5/142; H04N 5/2256; H04N 5/23212; H04N 5/23293; H04N 5/2254
USPC ............... 348/25–30; 382/100–154, 181–231
See application file for complete search history.

(56) References Cited

U.S. PATENT DOCUMENTS

| | | | | |
|---|---|---|---|---|
| 3,566,354 A * | 2/1971 | French | ............................ | 82/124 |
| 3,827,804 A * | 8/1974 | Miller et al. | .................... | 356/39 |
| 4,101,961 A * | 7/1978 | Fletcher et al. | ............... | 382/132 |
| 4,229,764 A * | 10/1980 | Danos | ............................. | 348/28 |
| 4,396,903 A * | 8/1983 | Habicht et al. | ................ | 382/103 |
| 4,424,530 A * | 1/1984 | Taylor | ............................. | 348/26 |
| 4,561,104 A * | 12/1985 | Martin | ........................ | 382/152 |
| 4,583,125 A * | 4/1986 | Yamada | ........................ | 358/447 |
| 4,592,089 A * | 5/1986 | Hartman | ....................... | 382/129 |
| 4,653,108 A * | 3/1987 | Kranitzky | ..................... | 382/199 |
| 4,656,594 A * | 4/1987 | Ledley | ............................ | 702/19 |
| 4,843,630 A * | 6/1989 | Catros et al. | .................. | 382/130 |
| 4,969,110 A * | 11/1990 | Little et al. | ..................... | 382/131 |
| 4,984,075 A * | 1/1991 | Munaoka | ........................ | 348/26 |
| 5,018,218 A * | 5/1991 | Peregrim et al. | ............... | 382/103 |
| 5,067,160 A * | 11/1991 | Omata et al. | ................ | 382/107 |
| 5,109,425 A * | 4/1992 | Lawton | ..................... | 382/107 |
| 5,125,046 A * | 6/1992 | Siwoff | ........................... | 382/114 |
| 5,130,795 A * | 7/1992 | Rusche et al. | ................ | 348/143 |
| 5,210,799 A * | 5/1993 | Rao | ................................. | 382/103 |
| 5,257,209 A * | 10/1993 | Markandey | ....................... | 701/1 |
| 5,258,924 A * | 11/1993 | Call et al. | ..................... | 382/103 |

(Continued)

*Primary Examiner* — Chia-Wei A Chen
(74) *Attorney, Agent, or Firm* — Schwegman, Lundberg & Woessner; Paul W. Martin (57) ABSTRACT

Methods and apparatus are provided for low resolution item identification using brightness compensated images. An image of an unknown item is captured in digital RGB image format and converted to HSV image format. Then the HSV formatted image is quantized which greatly reduces the resolution of the image. The quantized HSV image data of the unknown item is compared to a plurality of quantized HSV image data for known items. The comparison includes using a signal-to-noise ratio calculated using the quantized HSV image data for both the unknown and known items. A match is found when the calculated signal-to-noise ratio is above a predetermined threshold value.

22 Claims, 4 Drawing Sheets

(56) References Cited

U.S. PATENT DOCUMENTS

| | | | |
|---|---|---|---|
| 5,283,839 A * | 2/1994 | Edelman et al. | 382/103 |
| 5,371,542 A * | 12/1994 | Pauli et al. | 348/262 |
| 5,646,691 A * | 7/1997 | Yokoyama | 348/416.1 |
| 5,687,249 A * | 11/1997 | Kato | 382/104 |
| 5,764,804 A * | 6/1998 | Yajima et al. | 382/238 |
| 5,799,105 A * | 8/1998 | Tao | 382/167 |
| 6,044,168 A * | 3/2000 | Tuceryan et al. | 382/118 |
| 6,141,033 A * | 10/2000 | Michael et al. | 348/25 |
| 6,400,830 B1 * | 6/2002 | Christian et al. | 382/103 |
| 6,584,211 B1 * | 6/2003 | Hashimoto et al. | 382/103 |
| 6,792,136 B1 * | 9/2004 | Niesen | 382/118 |
| 6,845,177 B2 * | 1/2005 | Chiu | 382/199 |
| 6,940,999 B2 * | 9/2005 | Lin | 382/103 |
| 7,272,242 B2 * | 9/2007 | Nevis et al. | 382/103 |
| 7,362,921 B1 * | 4/2008 | Bober | 382/305 |
| 7,671,887 B2 * | 3/2010 | Pescatore et al. | 348/25 |
| 7,783,079 B2 * | 8/2010 | Monro | 382/107 |
| 8,063,930 B2 * | 11/2011 | Rotem et al. | 348/42 |
| 8,103,087 B2 * | 1/2012 | Maeda et al. | 382/149 |
| 8,174,562 B2 * | 5/2012 | Hartman | 348/42 |
| 8,254,627 B2 * | 8/2012 | Martin et al. | 382/103 |
| 8,477,192 B2 * | 7/2013 | Capello et al. | 348/148 |
| 8,717,420 B2 * | 5/2014 | Yasuda et al. | 348/47 |
| 8,761,580 B2 * | 6/2014 | Gausereide | 386/278 |
| 2008/0068450 A1 * | 3/2008 | Choi | 348/28 |

* cited by examiner

METHODS AND APPARATUS FOR ITEM IDENTIFICATION USING BRIGHTNESS COMPENSATION

CROSS-REFERENCE TO RELATED APPLICATIONS

This application is related to U.S. patent application Ser. No. 13/790,042, titled "Methods and Apparatus for Low Resolution Item Identification" filed on Mar. 8, 2013, having the same assignee as this application and which is hereby incorporated by reference in its entirety.

FIELD OF THE INVENTION

The present invention relates to improved methods and apparatus for identifying items and more specifically to such methods and apparatus that capture and process images to identify items presented for identification and purchase at a point of sale terminal.

BACKGROUND

Retail stores have used point of sale terminals with optical code scanners for years to process purchase transactions. The use of an optical code scanner to identify an item by reading an optical code on an item has increased the speed of processing items for purchase. However, over the years numerous methods have been developed to make fraudulent purchases of items scanned by an optical code scanner that only identifies an item by the optical code attached to the item. Attempts to mitigate the fraud include processing an image of items to identify the items instead of relying solely on the optical code for identification.

Current product identification processes that uniquely identify an item from an image of the item are very computational and memory intensive and the processes are further complicated by differences in item illumination. The number of possible known items, to compare an unknown item against, can easily exceed 100,000 items. Current identification techniques compare image data for an unknown item to each known item where the image data can include 100,000 bytes of data. This requires a very large database to store the data for the known items and a large amount of processing power to search through the data for known items to find a match for the unknown item. In addition, variations in item illumination or the amount of light directed at and reflected from an item being identified increase the rate of item misidentification.

SUMMARY

Among its several aspects, the present invention seeks to overcome or ameliorate at least one of the disadvantages of the prior art, or to provide a useful alternative.

Therefore, among its several aspects, the present invention recognizes it is desirable to compensate for variations in item illumination or brightness which will increase the item identification rate and reduce false identifications. The invention compensates for variations in item brightness by converting the captured image data stored in Red, Green, Blue (RGB) format to Hue, Saturation, Value (HSV) format and then using data for the Hue, Saturation and a weighted Value from the HSV format to identify the item.

Among its several aspects, the present invention recognizes it would be desirable to uniquely identify an item from an image of the item by only using characteristics of the item instead of using an optical code on the item. It is also desirable to only require a relatively small amount of data and processing power to identify each item. Using only a small amount of data to identify an item reduces the overall amount of data that must be stored and searched for each known item and reduces the amount of time required to uniquely identify the item. The use of brightness compensation techniques further reduces the amount of data processing required to identify an item and increases the percentage of successful item identifications. Also, identifying an item by an image of the item reduces fraud because fraud techniques applicable to an optical code are overcome by visual identification of the item.

Among its several aspects, the present invention recognizes that the computational time and memory required to uniquely identify an item can be greatly reduced by quantizing an image of the item to reduce the amount of data required to store the image data for the item. The present invention further recognizes that quantizing the image data by pixelating the image data so that less than 200 pixels remain greatly reduces the amount of image data for each item while still retaining sufficient resolution to identify the item.

Among its several aspects, the present invention recognizes that a match between an unknown and a known item using quantized image data for each can be accomplished by calculating a signal-to-noise ratio between the known item and a variance image. The variance image is the variance between the unknown and known items where their quantized image data is used to create the variance image.

Among its several aspects, the present invention recognizes that the process of uniquely identifying an item is enhanced by preselecting a subset of the known items where the subset includes the identity of the unknown item. The preselecting process can quickly reduce the universe of possible item candidates to a subset of known candidates that includes a known item that matches the unknown item but the preselecting process generally cannot positively identify the unknown item. The present invention uses the subset of the known item candidates to identify the unknown item with a high level of confidence.

In accordance with an embodiment of the present invention, there is provided a computer implemented method to identify an unknown item presented to an optical code scanner based on the appearance of the item. The method comprising: capturing an RGB formatted digital image of the unknown item by the optical code scanner; converting the captured image from RGB format to HSV format; generating a transform from the HSV formatted image using the hue and saturation data and a weighted amount of the brightness value in the HSV formatted image; and comparing the transform to data for a plurality of transforms for known items to determine the identity of the unknown item.

In accordance with another embodiment of the present invention, there is provided a computer implemented method to identify an unknown item presented to an optical code scanner based on the appearance of the item. The method comprising: capturing an RGB formatted digital image of the unknown item by the optical code scanner; converting the captured image from RGB format to HSV format; quantizing the converted HSV formatted image using the hue and saturation data and a weighted amount of the brightness value in the HSV formatted image wherein the weighted brightness value reduces variations in the brightness of the unknown item; and comparing the quantized image data for the unknown item to a plurality of similarly quantized image data for known items to determine a match between the quantized unknown item and a quantized known item.

In accordance with still another embodiment of the present invention an optical code scanner is provided. The optical code scanner comprising: an image capture device; a memory including computer instructions; and a processor in communications with the image capture device and the memory where the computer instructions when executed by the processor cause the processor to perform functions including: capturing an RGB formatted digital image of the unknown item by the image capture device; converting the captured image from RGB format to HSV format; quantizing the converted HSV formatted image using the hue and saturation data and a weighted amount of the brightness value in the HSV formatted image wherein the weighted brightness value reduces variations in the brightness of the unknown item; and comparing the quantized image data for the unknown item to a plurality of similarly quantized image data for known items where the comparing includes using a calculated signal to noise ratio (SNR) between the unknown and known quantized image data to determine when a match is found between the unknown item and a known item.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangements of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
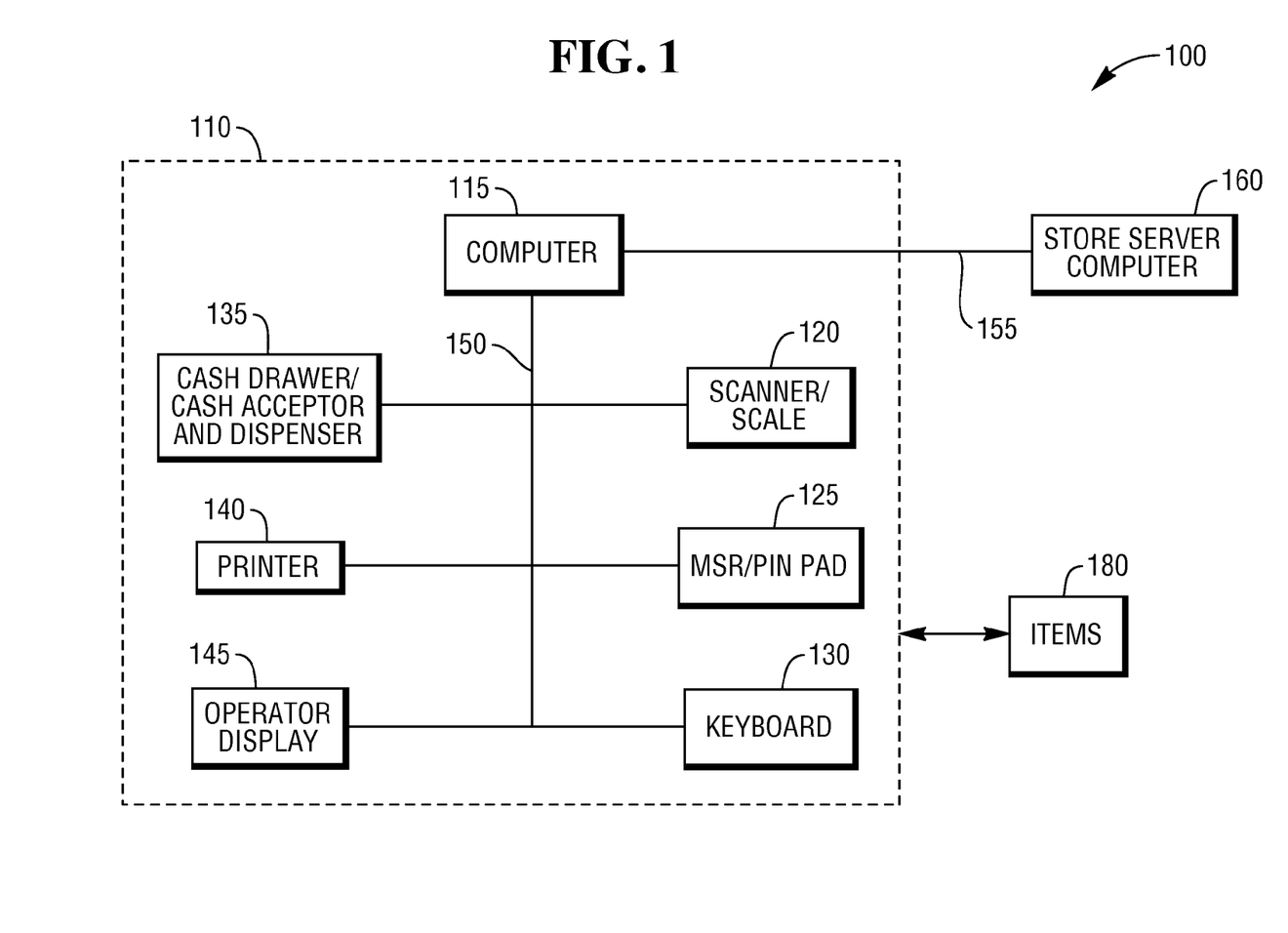
FIG. 1 is a high-level block diagram illustrating a point of sale system in accordance with the present invention.

With reference to FIG. 1, there is provided a high-level block diagram illustrating a point of sale system 100. The point of sale system 100 of the present embodiment includes a point of sale terminal 110 in communication with a store server computer 160 using a network 155. The point of sale terminal 110 performs purchase transactions by identifying one or more items 180 presented for purchase by a customer. During the purchase transactions, the point of sale terminal 110 communicates with the store server computer 160 to send and receive data related to the purchase transactions.

Although only one point of sale terminal 110 is depicted, it should be appreciated that the point of sale system 100 supports multiple point of sale terminals 110 that use the network 155 to communicate with the store server computer 160. Additionally, it should be appreciated that the point of sale terminal 110 may suitably be embodied as an assisted point of sale terminal or a customer operated point of sale terminal. In some embodiments, the point of sale system 100 includes both assisted point of sale terminals and customer operated point of sale terminals.

The network 155 may suitably include a network which uses a communications protocol based on transmission control protocol/internet protocol (TCP/IP). The network 155 may suitably include a combination of local area and wide area networks. The network 155 may further suitably include any combination of wireless and wired networks. The wireless networks include local area wireless computer networks and cellular based data networks.

The store server computer 160 includes a processor and memory where the memory includes application software. The processor of the store server computer 160 executes the application software which causes the processor to perform features and functions that support the operations of the store. The application software provides features and functions that may suitably include support for point of sale operations, an item lookup database, sales and inventory management, personnel management and customer assistance services.

The point of sale terminal 110 suitably includes a computer 115, a scanner/scale device 120, an MSR/PIN PAD device 125, a keyboard device 130, a cash drawer/cash acceptor and dispenser 135, a printer device 140, an operator display 145 and a computer network 150. The computer network 150 may include more than one type of network, each of which is used to communicate with different devices. The computer 115 communicates with the devices over the computer network 150 which may suitably include an implementation of the industry standard Universal Serial Bus (USB). The computer network 150 may additionally include a second network designed to communicate with a display device such as the operator display 145.

The computer 115 may suitably include a personal computer designed for use within another device such as the point of sale terminal 110. In some embodiments, the computer 115 is a single board computer. The computer 115 includes a processor, memory, a network controller for controlling the external network 155 and a computer network controller for controlling the computer network 150. The memory of the computer 115 includes computer instructions that are executed by the processor of the computer 115 and which cause the processor to control the components and devices of the point of sale terminal 110 and provide the high level functions of the point of sale terminal 110. In some embodiments, the memory includes a database and instructions that operate the database.

The MSR/PIN PAD device 125 is a magnetic stripe reader and personal identification number (PIN) device. It reads information from the magnetic stripe on a card that is moved through the device. For example, the device 125 reads the magnetic stripes found on the back of credit, debit and loyalty cards plus magnetic stripes found on the back of some driver's licenses. The PIN PAD allows a customer or operator to enter a personal identification number that may be associated with the card. This information is then securely transmitted to the computer over the computer network 150.

The cash drawer/cash acceptor and dispenser device 135 may suitably include just a cash drawer device or just a cash acceptor and dispenser device or both. Operator assisted embodiments of the point of sale terminal 110 may suitably include just the cash drawer device because an employee will handle the currency. Customer operated embodiments of the point of sale terminal 110 may suitably include just the cash acceptor and dispenser device which secure the currency but allow a customer to give and receive currency. In yet other embodiments, both the cash drawer device and cash acceptor and dispenser device are present. The cash drawer/cash acceptor and dispenser devices 135 communicate with and are controlled by the computer 115 using the computer network 150.

The operator display 145 includes an electronic device that displays information received from the computer 115 over the computer network 150 to a customer or operator. The operator display 145 further includes a touch screen input device that detects when and where it is being touched and sends the information to the computer 115 over the computer network 150. Some embodiments have more than one operator display 145 where one operator display 145 is used by an employee operating the point of sale terminal 110 and a second operator display 145 is used by a customer that is making a purchase.

Figure 2:
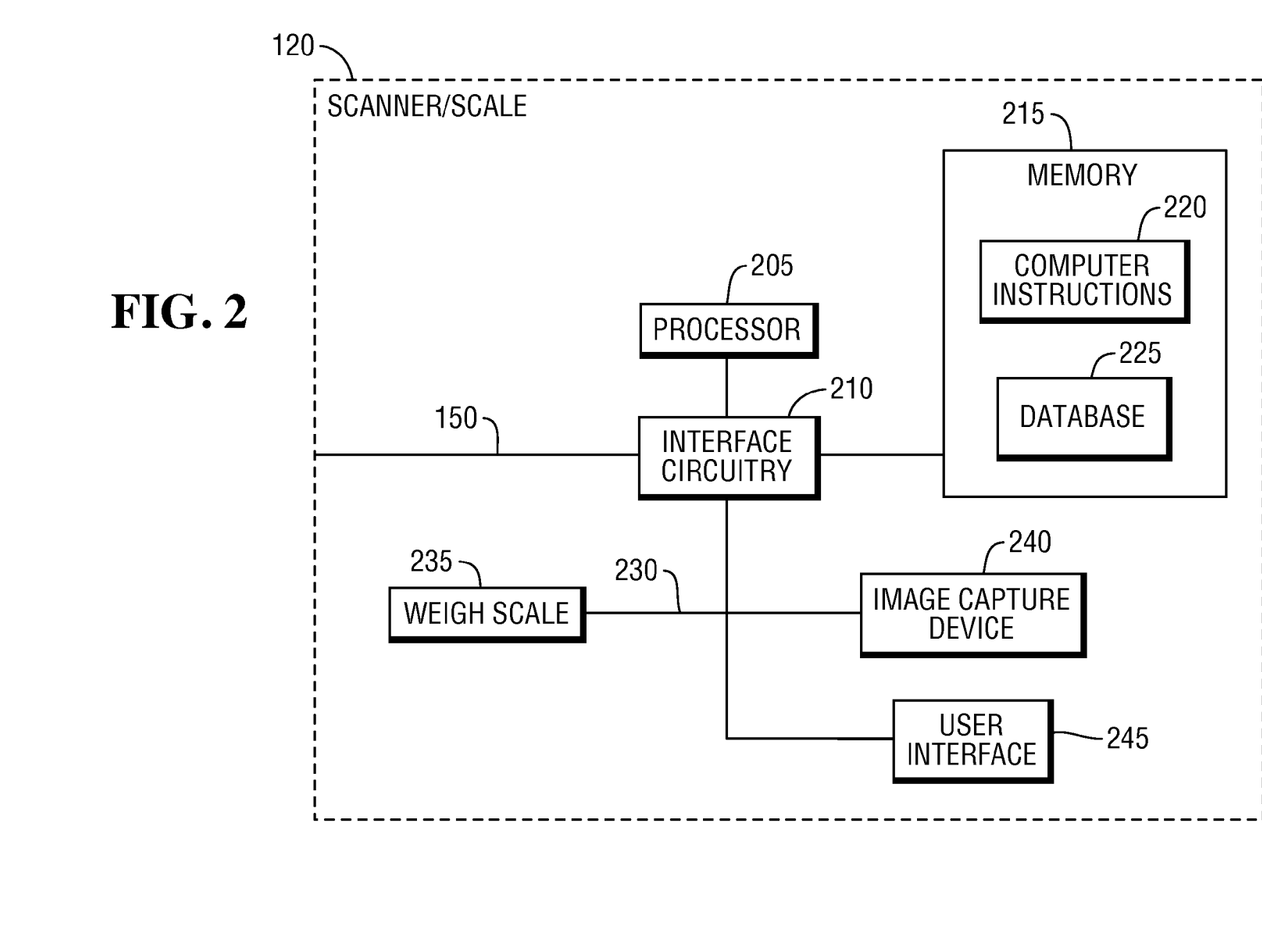
FIG. 2 is a high-level block diagram illustrating selected components of a scanner/scale.

Turning now to FIG. 2, there is provided a high-level block diagram illustrating selected components of the scanner/scale (scanner) 120. The scanner 120 identifies items 180 presented to the scanner 120 for purchase as part of a purchase transaction being performed by the point of sale terminal 110. The scanner 120 may suitably include a processor 205, interface circuitry 210, a memory 215, a weigh scale 235, an image capture device 240 and a user interface 245. The interface circuitry 210 provides the electronics required for the processor 205 to communicate with the memory 215, the computer network 150 and the other devices and components of the scanner 120 using a data network 230. The interface circuitry 210 generates the data network 230 that may suitably include electronics and software to generate an industry standard Universal Serial Bus (USB). The weigh scale 235 includes components, for example load cells, that determine the weight of items placed on the weigh scale 235 and communicates the weight to the processor 205 over the data network 230.

A multiple path image scanner with the ability to capture an image of an item presented to the scanner is shown in U.S. patent application Ser. No. 11/608,923 by Kwan entitled "A Method, System, and Apparatus for a Multiple Path Image Scanner" and is incorporated herein by reference in its entirety.

The memory 215 includes computer instructions 220 that are executed by the processor 205 which cause the processor 205 to perform the features and functions of the scanner 120. The computer instructions 220 when executed by the processor 205 further cause the processor 205 to control the devices and components of the scanner 120. In some embodiments, the memory 215 further includes a database 225 and the computer instructions 220 include instructions that when executed by the processor 205 will cause the processor 205 to implement the features and functions of a database using the database 225.

The image capture device 240 preferably includes a complementary metal oxide semiconductor (CMOS) color image capture device that captures an electronic image of an optical image directed to the CMOS image capture device. In some embodiments, other types of image capture devices are used for example, devices based on charge coupled device (CCD) technology. The electronic image is captured in the form of digital image data that represents the value of the light received by each pixel of the CMOS image capture device. The captured image is read by the processor 205 from the image capture device 240 over the data network 230. The image capture device 240 captures images of items 180 presented to the scanner 120 for identification. In some embodiments, the image capture device 240 includes a plurality of image capture devices where each image capture device captures images of items 180 from different directions to capture different sides of the items 180. In other embodiments, the image capture device 240 includes a plurality of image capture devices but preferably 6 or less devices are used and captured images of an item are processed to perform a virtual image rotation of the item so the front surface of the item appears to face forward in the image so the front surface can be used in the item identification process.

In some embodiments, the image capture device 240 further includes illumination devices which are controlled by the processor 205. The illumination devices generate light directed at each of the items 180 as they are presented for identification. The illumination devices provide controlled illumination of each of the items 180 to enhance the quality of the captured image of each of the items 180.

As part of a purchase transaction processed by the point of sale terminal 110, the items 180 are presented to the scanner 120 for identification so that the identity and value of each of the items 180 can be added to the purchase transaction. The processor 205 receives image data for one or more captured images from the image capture device 240 where the image data includes an image of one of the presented items 180. In the present embodiment, the image data includes data for 1.3 million pixels based on the size of the CMOS image capture device. In other embodiments, the number of pixels varies because different CMOS image capture devices with different resolutions are used.

The processor 205 receives image data that includes an image of one of the presented items 180. The processor 205 performs a shape analysis on the image to determine the location and general shape of the item within the image. The processor 205 then quantizes the image data by pixelating the image used to depict the item 180. The following discussion assumes the image of the item uses the entire captured image. The pixelation process reduces the 1.3 million pixels that represent the image to a very small number of pixels that represent the same image at a lower image resolution. In the present embodiment, the reduced number of pixels is preferably 108 pixels but in other embodiments, the reduced number of pixels can vary from this value by hundreds of pixels. However, the lower the number of pixels, the more efficient the system 100 is at identifying items presented to it. The pixelation process takes a block of adjacent pixels and converts them to a single pixel that now represents the block of adjacent pixels. The processor 205 uses an averaging function to combine the adjacent pixels. The averaging function uses one or more parameters of each of the adjacent pixels to generate a value for the single pixel. For example, the averaging function will independently average data for hue values, saturation values and brightness values and the combined pixel will include the averaged values for each of these parameters. In some embodiments, the process to combine the pixels uses a bi-linear interpolation method. In other embodiments, the process to combine pixels uses a bi-cubic interpolation method.

In the present embodiment, the block of the adjacent pixels is square and measures approximately 110 pixels by 110 pixels or 110 rows of pixels by 110 columns of pixels. However, the block does not have to be a square area of pixels. The block can be a rectangle where the longer dimension of the rectangle can be either the vertical or horizontal dimension. Whatever dimension size is used for the block, the total number of pixels within the block should be approximately equal to the number of pixels within the 110 by 110 pixel square block so that the resulting number of pixels is approximately 108. These numbers assume the entire image is used to capture the image of an item. If the area of the captured item comprises less than the entire available image, the image data not representing the captured item is discarded from the image. The remaining image data is pixelated to generate the approximate 108 pixels.

Rectangular adjacent pixel blocks are useful to minimize image distortions. For example, when a can is being identified, the information located about the vertical center of the surface of the can that generally faces the image capture device 240, is clear and typically easier to identify than information located at either side of the can which while still visible faces away from the image capture device 240. To compensate for the distortions, a rectangular adjacent pixel block is selected where the horizontal dimension of the block is larger than the vertical dimension of the block.

The database 225 stored in the memory 215 of the scanner 120 includes a data record for every item that the scanner can identify. Each data record includes information that identifies an item, preferably an International Product Code (IPC) and pixelated image data for the item. The pixelated image data uses the same process described above. In some embodiments, the database includes 100,000 data records. The processor 205 compares the pixelated image data for the item 180 to be identified to the pixelated image data stored in each data record stored in the database 225.

In some embodiments, the comparison of pixelated image data is accomplished using a signal-to-noise ratio (SNR) where the signal energy S is calculated using the pixelated image data stored in the database and the noise energy N is calculated using data for a variance image generated by calculating the pixel variance between the pixelated image data for the item 180 and pixelated image data from a data record stored in the database. The value for each pixel in the variance image is the difference in brightness between corresponding pixels from the pixelated image data for the item 180 and the pixelated image from a data record stored in the database. If the two pixelated images are identical, the value of each pixel in the variance image will be zero because the brightness values are identical between corresponding pixels.

In the present embodiment, the S value is calculated using the root-mean-square (RMS) of the pixelated image data for a known item stored in a data record in the database 225. Before the N value can be calculated, a variance image is generated. The variance image is the variance between the pixelated image for the item 180 and the pixelated image for the known item used to calculate the S value. The N value is then calculated using the RMS of the variance image. It should be noted that the data for each of the pixelated images includes HSV data. The data for each pixel has data for hue, saturation and brightness. A single RMS value is generated that includes data for all three parameters. In some embodiments, only data from one parameter is used to calculate the RMS value. The formula for calculating the SNR is: SNR=S/N.

When the pixelated image for an unknown item is compared to a stored pixelated image for a known item that is a match to the unknown item, the pixel values for the variance image are zero or almost zero because the image of the unknown item is identical or almost identical to the image of the known item. Different image angles can cause small variations in the images. The resulting SNR is an average number (S) divided by a very small number (N). The SNR value is used to determine a level of confidence that a match has been found between the unknown item and the known item in the database record it is being compared against. An SNR number at or above 2.83 indicates a 99% level of confidence or an error rate of 1 in 31,000 bits. An SNR threshold value is set for the comparison and a successful identification must meet or exceed the threshold value. The threshold value is a predetermined value that can be changed as desired for system 100. Among other things, the selection of the threshold value is a balance between accepting a false identification and not finding a valid identification for the item.

In some embodiments, the database 225 is custom designed to receive the pixelated image data for the item 180 and then to perform all of the comparisons to the pixelated image data in the stored data records and to return the data record that matches the item 180 based on the SNR comparisons.

Figure 3A:
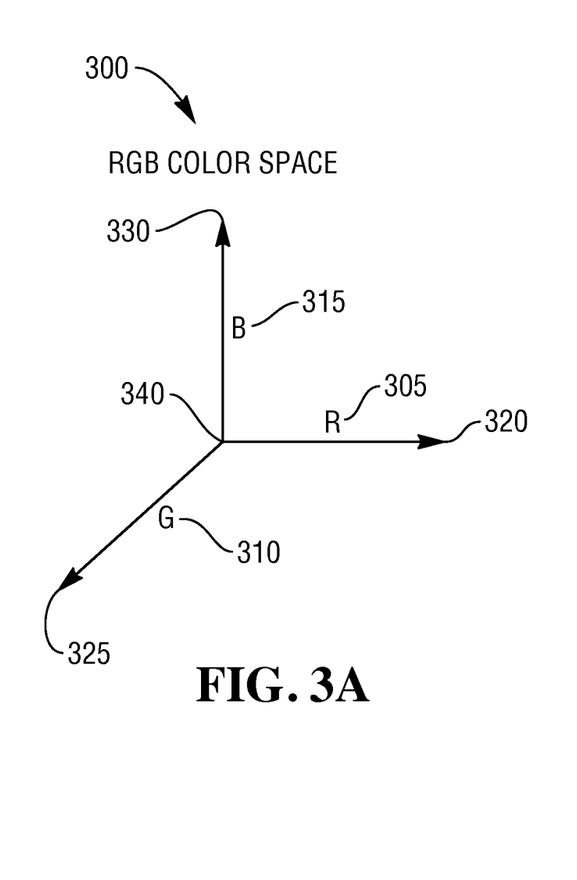
FIG. 3A is a high-level diagram illustrating RGB color space.

With reference to FIG. 3A, there is provided a high-level diagram illustrating RGB color space 300. An optical code scanner creates a digital image of an item by capturing pixel data that represents the item. The pixel data is stored using red, green, and blue (RGB) color space format. The RGB format uses a Cartesian coordinate system and three vectors to represent a color and intensity at a point in the RGB color space. Each vector is an axis in the Cartesian system. The first vector 305 represents the intensity of red light. The second vector 310 represents the intensity of the green light and the third vector 315 represents the intensity of the blue light. The origin 340 in RGB space (0,0,0) represents the color black or zero light intensity for all three colors. The maximum light intensity of each color 320, 325, 330 represents the color white or the maximum light intensity for all three colors.

Figure 3B:
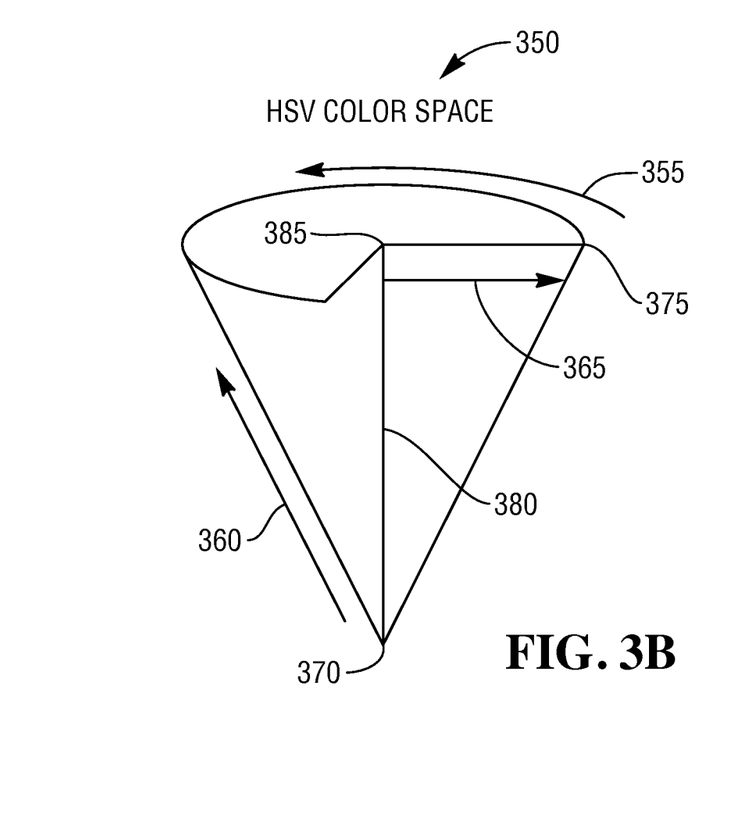
FIG. 3B is a high-level diagram illustrating HSV color space.

With reference to FIG. 3B, there is provided a high-level diagram illustrating HSV color space 350. HSV color space 350 represents colors and their intensity using three vectors that represent hue 355, saturation 365 and brightness 360 values of a color. The HSV color space 350 is represented using a version of a polar coordinate system shaped in the form of a cone. The hue 355 is the polar angle measured counter clockwise from the origin 375. The saturation 365 is a radius from and perpendicular to the polar axis 380 and the value (brightness) 360 is the distance from the pole 370 of the HSV color space 350. The pole 370 in HSV space 350 represents the color black or zero light intensity for all colors. White light with a maximum intensity is represented at point 385 in the center of the top plane. This point has a radius of zero and the value vector is set at its maximum value. The hue 355 can be any angle because the radius is zero so the angle component will always be zero.

It should be noted that in HSV color space 350, the luma or brightness data is separated from the chroma or color data. In HSV space 350, the brightness data is the value 360 vector and the color data is represented by the hue 355 and saturation 365 vector. Therefore, the negative affects caused by variations in the brightness are mitigated if the value vector 360 is reduced when comparing image data from an unknown item to image data from one or more known items. Using the color data (hue 355, saturation 365) with reduced brightness 360 data for an image increases the ability to identify the item in the image. The brightness value 360 is reduced by a weighting value to at least half of the original value. In some embodiments, the weighting value is set to 0.35. It should be noted that the weighting value will change based on the environment of the system where the identification system is being used but the weighting value is typically less than 0.50. Whatever weighting value is selected, the same weighting value is used to generate the known images of items that the unknown item image is compared against to find a match. In some embodiments, the weighting value is set to zero which means the brightness value 360 becomes zero. This is not the optimum method for identifying an item but it does have advantages when large variations in brightness are expected in a given system. Image data stored in RBG format is transformed to image data in HSV format using a series of mathematical formulas that converts the RGB data for each pixel to HSV data.

Figure 4:
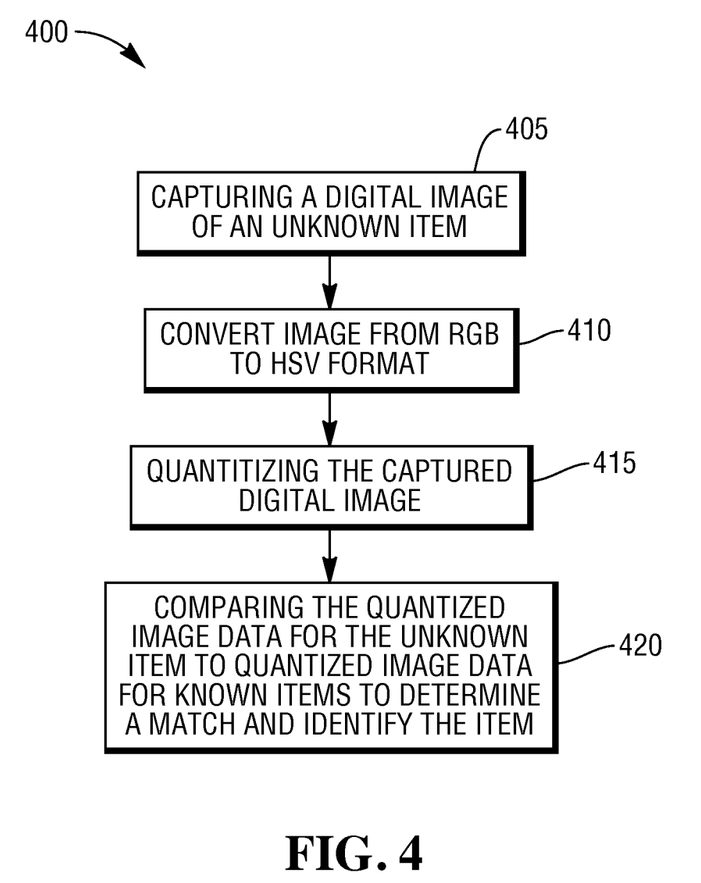
FIG. 4 is a high-level flow diagram illustrating a method of operating the scanner/scale to identify an item.

Turning now to FIG. 4, there is provided a flow diagram illustrating a method of operating the scanner 120 to identify the item 180. In this method 400, an unknown item 180 is presented to the scanner 120 for identification as part of a purchase transaction being performed by the point of sale terminal 110. This method 400 includes the above described processes for converting image data from RGB to HSV format, for quantizing the HSV formatted image data, and for using a SNR technique to identify an unknown item 180 represented in the image from a set of known items also including quantized image data. In this embodiment, the image data is formatted as an HSV image. As the image data is modified, the HSV format is maintained but the resolution of the image is lowered.

In step 405, the scanner 120 captures an image of the unknown item 180. The image capture device 240 captures the image which includes RGB formatted image data. The processor 205 receives the image data from the image capture device 240.

In step 410, the processor 205 converts the RGB formatted image data to HSV formatted image data where the brightness value 360 is separate from the hue 355 and saturation value 365. In some embodiments, the brightness value 360 is used along with the hue 355 and saturation 365 values to identify an item but the brightness value 360 weighted to reduce its significance in relation to the hue 355 and saturation 365 data. The weighting value is 0.35. That is, the actual value 360 number is multiplied by 0.35 to get the weighted value for the value 360. In other embodiments, just the hue 355 and saturation 365 data is used to identify an item.

In step 415, the processor 205 quantizes the HSV image data for the captured image of the unknown item 180. Quantizing the HSV image data involves using a pixelation process to reduce the number of pixels represented in the HSV image data by combining data for multiple pixels into data for one pixel. The quantized HSV image data that is produced by the quantizing process has a total of 108 pixels. In other embodiments, the total number of pixels produced by the quantizing process varies but is generally less than 200 pixels. The quantization process transforms the HSV image data by reducing the amount of data required for the image while still retaining sufficient information to identify the item stored in the image. In other embodiments, the HSV data is transformed using a different method or an additional transformation is made such as identifying certain physical characteristics of the item to be identified.

In step 415, the processor 205 performs the comparison process described above where the quantized HSV image data for the unknown item 180 is compared to a plurality of quantized HSV image data for known items. The comparison process calculates a signal-to-noise ratio (SNR) between the quantized image data for a known item (the signal) and a generated variance image data (the noise). The signal and the noise values are generated using the root-mean-square (RMS) for the respected quantized image data. The variance image data is generated by calculating the variance between the quantized HSV image data for the unknown item 180 and the quantized HSV image data for the known item the unknown item 180 is being compared against. An SNR value is used to determine if the known item matches the unknown item. If the calculated SNR value is below a predetermined threshold value, there is no match. If the calculated SNR value is equal to or above the predetermined threshold value, a match is confirmed with a level of confidence that is calculated for the specific threshold value. Larger threshold values relate to a higher level of confidence. An SNR value of 2.83 indicates a 99% level of confidence that the unknown item 180 is the known item. When a match is found, the processor 205 returns identification information stored with the quantized HSV image data for the known item as the identity of the unknown item 180. The identification information may suitably include a universal product code (UPC) for the item. In some cases, multiple known items will have an SNR value that is greater than the threshold value. In these cases, the known item with the largest SNR value is used to identify the unknown item.

Although the present invention has been described with particular reference to certain preferred embodiments thereof, variations and modifications of the present invention can be effected within the spirit and scope of the following claims.

What is claimed is:

1. A computer implemented method to identify an unknown item presented to an optical code scanner based on the appearance of the item, the method comprising:
   capturing an RGB formatted digital image of the unknown item by the optical code scanner;
   converting the RGB formatted digital image from RGB format to a different format characterized by hue, saturation, and brightness data to produce a different formatted image;
   generating a transform from the different formatted image using the hue data, the saturation data and a weighted amount of the brightness data in the different formatted image;
   comparing the transform to transform data of a plurality of transforms for known items to determine the identity of the unknown item;
   wherein the transform is generated by quantizing the hue data, the saturation data, and the weighted amount of the brightness data to reduce an amount of image data associated with the unknown item and wherein comparing the transform includes comparing quantized image data for the unknown item to a plurality of quantized image data for known items where the comparing includes using a calculated signal to noise ratio (SNR) between the unknown and known quantized image data to determine when a match is found between the unknown item and one of the known items.

2. A computer implemented method to identify an unknown item presented to an optical code scanner based on the appearance of the item, the method comprising:
   capturing an RGB formatted digital image of the unknown item by the optical code scanner;
   converting the captured image from RGB format to HSV format;
   quantizing the converted HSV formatted image using the hue and saturation data and a weighted amount of the brightness value in the HSV formatted image wherein the weighted brightness value reduces variations in the brightness of the unknown item; and
   comparing the quantized image data for the unknown item to a plurality of similarly quantized image data for known items to determine a match between the quantized unknown item and a quantized known item.

3. The method of claim 2 wherein determining a match includes using a calculated signal to noise ratio (SNR)

between the unknown and known quantized image data to determine when a match is found between the unknown item and a known item.

4. The method of claim 2, wherein the quantizing step includes performing a pixelation on the captured image data to reduce the size of original image data.

5. The method of claim 2, wherein the comparing step includes calculating the root-mean-square (RMS) for the quantized image data of the unknown item.

6. The method of claim 5, wherein the comparing step further includes generating variance image data where the variance image data is the difference between the quantized image data of the unknown item and quantized image data for the known item.

7. The method of claim 6, wherein calculating the SNR includes calculating a signal value which is the RMS value of the quantized image data of the known item and calculating the "noise" value which is the RMS value of the variance image data and the value for the SNR is calculated by dividing the "signal" value by the "noise" value.

8. The method of claim 7, wherein a predetermined threshold SNR value is used to determine the minimum confidence level that can be used to determine that a match has been found.

9. The method of claim 7, wherein within the quantized image data for both the known and unknown items, the data for each pixel is reduced to include data for only one color.

10. The method of claim 2, wherein the plurality of quantized image data for known items are stored in a database.

11. The method of claim 10, wherein the database is stored in the optical code scanner.

12. The method of claim 10, wherein the database is a customized database and accepts the quantized image data for the unknown item and performs the comparison to the quantized image data for the known items stored in the database and returns the known item that matches the unknown item.

13. The method of claim 2, further including selecting the plurality of quantized image data for known items from a larger set of quantized image data for known items using one or more physical attributes of the unknown item.

14. The method of claim 2, wherein the quantizing step reduces the number of pixels represented in the captured image data down to fewer than 200 pixels.

15. The method of claim 2, wherein there are multiple quantized images for each known item where at least one quantized image was generated from an image taken of the front of the item and at least one quantized image was generated from an image taken of the back of the item.

16. An optical code scanner comprising:
an image capture device;
a memory including computer instructions; and
a processor in communication with the image capture device and the memory where the computer instructions when executed by the processor cause the processor to perform functions including:
capturing an RGB formatted digital image of the unknown item by the image capture device;
converting the captured image from RGB format to HSV format;
quantizing the converted HSV formatted image using the hue and saturation data and a weighted amount of the brightness value in the HSV formatted image wherein the weighted brightness value reduces variations in the brightness of the unknown item; and
comparing the quantized image data for the unknown item to a plurality of similarly quantized image data for known items where the comparing includes using a calculated signal to noise ratio (SNR) between the unknown and known quantized image data to determine when a match is found between the unknown item and a known item.

17. The optical code scanner of claim 16, wherein the quantizing step includes performing a pixelation on the captured image data to reduce the size of original image data.

18. The optical code scanner of claim 17, wherein the comparing step includes calculating the root-mean-square (RMS) for the quantized image data of the unknown item.

19. The optical code scanner of claim 17, wherein the comparing step further includes generating variance image data where the variance image data is the difference between the quantized image data of the unknown item and quantized image data for the known item.

20. The optical code scanner of claim 19, wherein calculating the SNR includes calculating a signal value which is the RMS value of the quantized image data of the known item and calculating the noise value which is the RMS value of the variance image data and the value for the SNR is calculated by dividing the signal value by the noise value.

21. The optical code scanner of claim 20, wherein a predetermined threshold SNR value is used to determine the minimum confident confidence level that can be used to determine a match has been found.

22. The optical code scanner of claim 16, wherein the plurality of quantized image data for the known items are stored in a database stored in the memory.

* * * * *